Sept. 5, 1933.   W. S. JAMES   1,925,253
SPRING COVER
Filed June 12, 1931
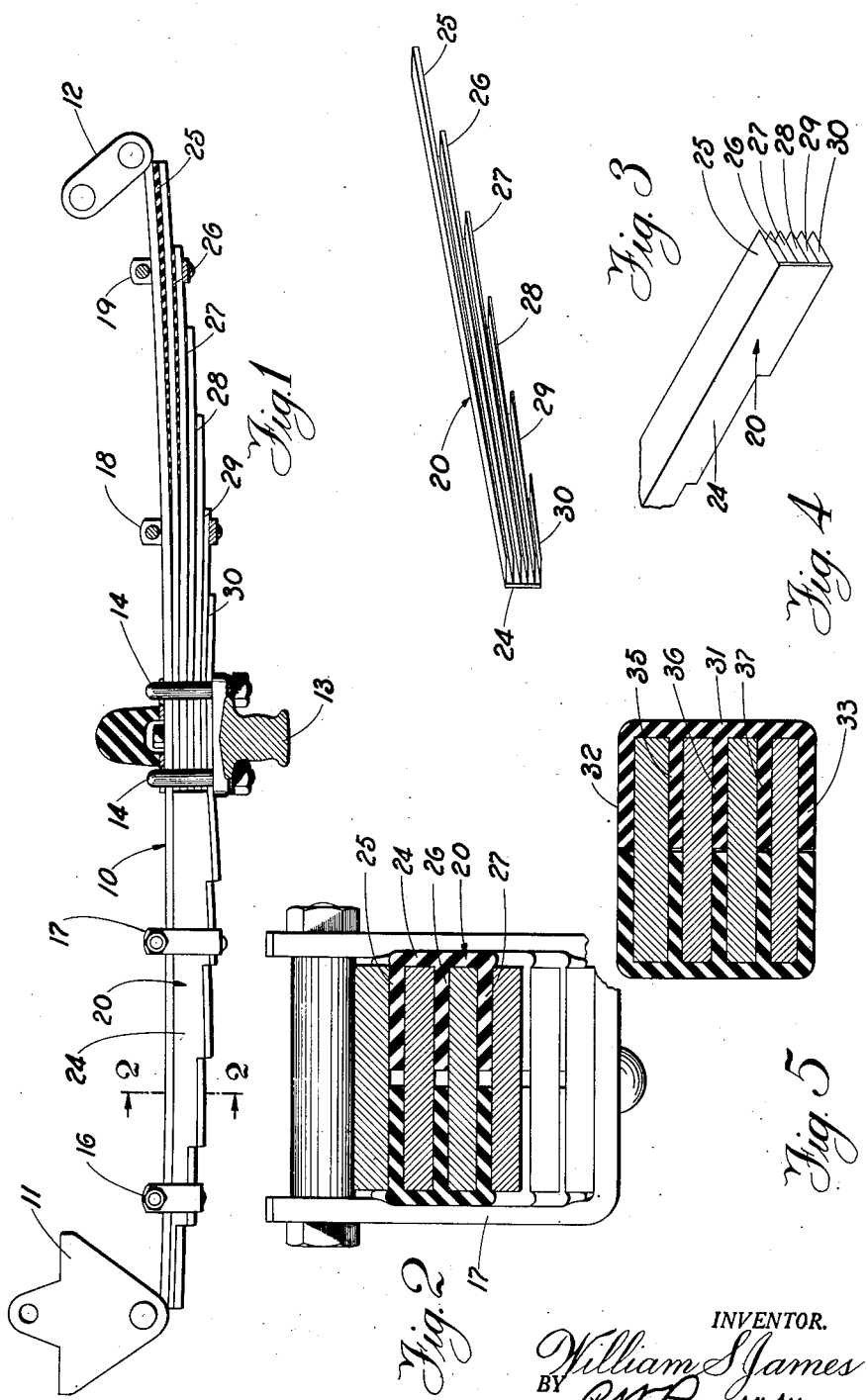

Patented Sept. 5, 1933

1,925,253

UNITED STATES PATENT OFFICE 1,925,253

SPRING COVER

William S. James, South Bend, Ind., assignor to The Studebaker Corporation, South Bend, Ind., a corporation of New Jersey Application June 12, 1931. Serial No. 543,813

3 Claims. (Cl. 267—37)

This invention relates to a vehicle spring cover and has for its principal object the provision of a spring cover that is simple and economical to manufacture, easy to apply, and which at the same time will effectively protect the springs from moisture and grit, to the injurious effects of which vehicle springs are ordinarily subjected.

A further object is to provide integrally with the cover, suitable resilient means to be interposed between the leaves of the spring so that the springs will not require any internal lubrication and at the same time, the leaves will have no tendency to stick together to minimize the elasticity of the springs.

A still further object is to provide a spring cover having resilient inserts of rubber, or a similar elastic substance, interposed between the leaves of the spring to permit slight relative motion of the leaves and to act as a silencer so that there will be no squeak or screech as the spring leaves move relative to each other.

It is also an object of this invention to provide a spring cover that is sufficiently elastic to follow the resilient movements of the springs and last substantially the effective life of the springs without renewal.

It has been the usual practice to lubricate the contacting surfaces of the leaves of a vehicle spring with a heavy graphite grease during the assembly of the spring and then to mount the spring on a vehicle and permit it to function unprotected for its effective life. The springs being mounted beneath the body of the vehicle are frequently subjected to a spray of water and grit or mud from wet road surfaces, or of dry grit from dusty road surfaces. The action of the spring tends to quickly press the lubricant out from between the leaves thus leaving bare metal surfaces which are easily corroded by the moisture and roughened by the grit so that the spring leaves stick together and the resilient function of the laminated structure is largely lost. Some attempts have been made to provide covers for such springs, but the covers heretofore provided lack resiliency and thus are soon rendered ineffective to adequately protect the springs, and since they have no provision to prevent the lubrication from being pressed out of the springs, they must frequently be removed in order that the springs may be lubricated.

In order that those skilled in the art may fully understand the construction of the subject matter of this invention and the mode of operation thereof, the same will now be briefly described in connection with the accompanying drawing which shows a preferred embodiment of the inventive idea. The drawing however, is to be considered as illustrative only and not in a limiting sense as the scope of the invention is to be determined entirely by the scope of the subjoined claims.

Referring to the accompanying drawing in which like numerals of reference indicate like parts throughout:

Figure 1 is an elevation of the front spring of a vehicle showing my invention applied thereto, one unit of the invention being broken or cut away to more clearly show the application of the device.

Figure 2 is a sectional view on the line 2—2 of Figure 1.

Figure 3 is a perspective view of one unit of the spring cover forming the subject matter of this invention.

Figure 4 is a perspective view of the opposite side of the device shown in perspective in Figure 3, and Figure 5 is a sectional view of a modified form of the invention.

The numeral 10 generally indicates a motor vehicle spring which, in the illustration shown is one of the front springs of the vehicle. The spring is pivotally secured to the motor vehicle by means of the shackles 11 and 12 at the opposite ends thereof and is secured intermediate its length to the axle 13 by means of the U-bolts 14.

The spring cover illustrated consists of four separate similar parts, one of which is shown in perspective in Figure 3, and as the four parts are similar in construction and application, except that some may be described as "righthand" and others as "lefthand" in order to fit about both sides of the spring and the covers for the rear part of the spring may be slightly longer than the covers for the front part thereof, a description of one part is believed entirely adaquate for the purpose of this specification.

Each unit or part of the spring cover generally indicated by the numeral 20, consists of a web portion 24 adapted to lie along the side of the spring, the width of the web portion being the distance between the outside or top and bottom leaves of the spring at any point along the length of the spring. Integrally formed on the web portion 24 are wedge shaped fin portions which correspond in number to the number of leaves in the spring. In the illustration shown, there being six such fins at the maximum depth of the spring, numbered 25, 26, 27, 28, 29 and 30. The width of each of these fin portions is slightly less than one-half the width of a spring leaf and the length thereof corresponds to the length of the spring leaf immediately below the fin when the fins are inserted in proper position between the leaves of the spring. From an inspection of Figures 1 and 3, it will be observed that these fins taper from a thin edge at a point near the axle mounting, to a thickness proportional to the length of the fin at the outer extremity thereof. Each section of the spring cover described above is formed of resilient rubber and is molded as a unit and integrally vulcanized. The spring clips 16, 17, 18 and 19 are mounted over the spring cover and that portion of the web between the spring and spring clip is compressed and serves as a silencer between the spring and the spring clip.

In order to assemble the cover on the spring, the leaves of the spring are separated, the fin portions of the cover are inserted between the leaves of the spring in proper position, four units being assembled on each spring to form a substantially complete inclosure therefor, and the spring clips are then mounted over these units and secured to the spring, at the same time securing the cover units in place upon the spring. It will be readily apparent that by forming this cover of elastic material such as vulcanized rubber, the cover will easily follow the resilient motions of the spring and will not be broken or disrupted thereby, and the resilient fins between the spring leaves will permit the leaves a sufficient motion relative to each other to afford the full function of flexibility of the laminated structure and will do away with the necessity of lubricating the surfaces of the leaves.

In the modification shown in Figure 5, the structure is substantially the same as that shown in Figures 1, 2 and 3, except that in the modification the web is provided with top and bottom flanges 32 and 33 which fit respectively over the top and bottom of the spring and, with the web or side portion, form a complete enclosure for that part of the spring to which the unit is applied. The wedge-shaped fins 35, 36 and 37 are integrally vulcanized to the web 31 as in the construction previously described.

It is also within the scope of this invention that the rubber spring covers may be vulcanized directly on to the spring as by placing separators between the leaves of the assembled spring, placing the spring in a mold, forcing plastic rubber into the spaces between the spring and the mold and between the adjacent spring leaves and then subjecting the rubber to a vulcanizing temperature. Upon removing the mold the cover will then be completely assembled to the spring and the rubber will be vulcanized to the metal surfaces of the spring in such a manner that it will not readily peel or chip off and the cover will have no tendency to move on the spring.

Having now fully described my invention and the mode of operation thereof, I claim:

1. An elastic cover for a multi-leaf spring comprising a plurality of integral units adapted to be mounted about the spring to provide a substantially complete enclosure therefor, each unit comprising a web portion adapted to contact leaf edges, and a plurality of wedge shaped fin portions integral with said web portions and adapted to be inserted between leaves of the spring.

2. An elastic cover for a multi-leaf spring comprising a plurality of separate units of vulcanized rubber, each unit comprising a web portion adapted to contact leaf edges, and a plurality of integral fins adapted to be inserted between leaves of the spring, the width of said fins being less than one-half the width of the spring leaves.

3. An elastic cover for a multi-leaf spring comprising a plurality of tapered channels each having a web and lateral flanges, and a plurality of wedge shaped fin portions integral with said web between said flanges and adapted to be inserted between the leaves of the spring, said tapered channels being adapted to be assembled about the spring in such a manner as to provide a substantially complete enclosure therefor.

WILLIAM S. JAMES.